United States Patent
Kim

[19]

[11] Patent Number: 5,870,281

[45] Date of Patent: Feb. 9, 1999

[54] LOCKING PORTABLE COMPUTER

[75] Inventor: Tae-Yong Kim, Seoul, Rep. of Korea

[73] Assignee: SamSung Electronics Co., Ltd., Suwon, Rep. of Korea

[21] Appl. No.: 902,130

[22] Filed: Jul. 30, 1997

[30] Foreign Application Priority Data

Jul. 31, 1996 [KR] Rep. of Korea .................. 1996/31981

[51] Int. Cl.⁶ ................................ G06F 1/16; H05K 7/16
[52] U.S. Cl. ............................... 361/681; 70/58; 16/319; 361/726
[58] Field of Search ................... 361/680–683, 361/726; 70/58, 59; 16/319, 321, 323, 337, 342, 343, 347

[56] References Cited

U.S. PATENT DOCUMENTS

| | | | |
|---|---|---|---|
| 5,088,156 | 2/1992 | Hosoi | 16/342 |
| 5,109,572 | 5/1992 | Park | 16/334 |
| 5,355,279 | 10/1994 | Lee et al. | 361/681 |
| 5,402,309 | 3/1995 | Ohgami et al. | |
| 5,446,618 | 8/1995 | Tetsuya et al. | |
| 5,447,044 | 9/1995 | Chang | |
| 5,447,045 | 9/1995 | Chang | |
| 5,450,271 | 9/1995 | Fukushima et al. | |
| 5,548,981 | 8/1996 | Kirk | |
| 5,586,363 | 12/1996 | Fanuzzi | 16/342 |
| 5,653,001 | 8/1997 | Lane | 16/340 |
| 5,673,169 | 9/1997 | Wicks | 361/680 |

*Primary Examiner*—Lynn D. Feild
*Attorney, Agent, or Firm*—Robert E. Bushnell, Esq.

[57] ABSTRACT

A portable computer having a locking device for preventing other persons from accessing the portable computer. The portable may be constructed with a base having a hinging part with a hinging hole formed therein; a display panel pivotally mounted on base; a locking device installed inside the hinging part; a guiding body having a guiding aperture with a predetermined length formed thereon and having a rotating lug placed on the predetermined position therein; a rotating body whose end part is fastened upon the outer surface of the side panel in state that it is fitted in the inside of the guiding body, having an inclining aperture at a circumferential surface which intersects, at a predetermined angle, with the guiding aperture, a rotating aperture into which a rotating lug fits and a key hole formed on its outer surface; and a fixing member fitted into the inside of the rotating body, which has a guiding lug to be put into the guiding aperture through the inclining aperture and a recess with a predetermined depth a shape therein. Therefore, it is impossible for those who try to take any important information out of portable computers by using the locking device of the present invention. In addition to that, it can prevent the loss of all information stored or any malfunction of the system due to access of children to a portable computer.

14 Claims, 5 Drawing Sheets

LOCKING PORTABLE COMPUTER

CLAIM OF PRIORITY

This application makes reference to, incorporates the same herein, and claims all benefits accruing under 35 U.S.C. §119 from an application for A Portable Computer earlier filed in the Korean Industrial Property Office on 31 Jul. 1996 and there duly assigned Ser. No. 31981/1996.

FIELD OF THE INVENTION

The present invention relates to a portable computer, and more particularly to a portable computer with a display panel pivotally mounted on base having a locking device that is designed to prevent other person from accessing the portable computer when its lid is in its closed position and resulting in protecting important information in it against leakage.

DESCRIPTION OF THE RELATED ART

Portable computers such as a notebook computer or a laptop computer have achieved a recent popularity amongst users. They have natural advantage that they submit to use wherever desired. Most portable computers find use on a person's lap or on a desk. These so-called laptop computers allow for an individual simply to open the top and place the device on his laps in front of him while sitting. Thus, he may use such a portable computer while sitting on a chair, on a bench, or even while riding on a plane or in a car.

Generally, a portable computer includes a base having a pair of hinging part with hinging holes formed and a pivotally mounted display panel having a flat LCD screen mounted therein. So, opening the display panel to use it is easy. Therefore, a problem with these portable computers is that anyone who knows how to operate any computers can have access to other person's computer to take important information out of it. Additionally, children may open the lid to press any keys carelessly, which may lead to erasing all information stored or any malfunction of the system.

U.S. Pat. No. 5,447,045 for an Apparatus For Locking a Closed Notebook Computer on a Computer Support to Cheng and U.S. Pat. No. 5,450,271 for a Portable Computer Docking Apparatus Including a Key Mechanism Controlling a Power Supply and a Locking Mechanism to Fukushima et al each disclose security devices for notebook computers. However, in these two patents, the notebook computer is locked to a docking station or to a support.

I have discovered that what is needed is a notebook computer that locks onto itself, without the use of a docking station or a computer support. I expect that a locking mechanism is required that will protect the notebook computer from unauthorized access without the use of excess equipment such as docking stations or computer supports.

SUMMARY OF THE INVENTION

It is therefore an object to provide a portable computer which is designed to prevent any unauthorized person from opening the portable computer with its lid closed and to protect important information in the portable computer against leakage.

According to an aspect of the present invention, in order to accomplish the object stated above, the present invention is made up of a base having a hinging part with a hinging hole formed therein, a display panel pivotally mounted on the base and having a hinging shaft formed to its lower part, and a locking device installed inside the hinging part, which prevents the hinging shaft from being rotated by moving in a horizontal direction and grasping the hinging shaft.

In such an invention, the locking device that is incorporated into the hinging part of the base and is formed therein is made up of a guiding body having a guiding aperture with a predetermined length formed thereon and having a rotating lug placed on the predetermined position therein; a rotating body whose end part is fastened upon the outer surface of the side panel in state that it is fitted in the inside of the guiding body, having an inclining aperture at a circumferential surface which intersects, at a predetermined angle, with the guiding aperture, a rotating aperture into which a rotating lug fits and a key hole formed on its outer surface; and a fixing member fitted into the inside of the rotating body, which has a guiding lug to be put into the guiding aperture through the inclining aperture and a recess with a predetermined depth a shape therein.

In this invention, the rotating body rotates in the same direction as that of opening of the display panel when locked. The locking device has a locking seat projecting in a predetermined height out of an inner part of the base and a locking lug, which is formed on a predetermined circumferential surface of the rotating body, to be fixed into the locking seat when the inserted key is rotated to lock. The end part of the hinging shaft is polygon-shaped.

In accordance with another aspect of the present invention in order to accomplish the object stated above, the portable computer of this invention that has a hinging part with a hinging hole formed therein and a display panel having a hinging shaft to be fitted into the hinging hole formed to its lower part made up of a locking seat projecting in a predetermined height out of an inner part of the base and a locking device installed inside the hinging part, which prevents the display panel from being detached out of the base by moving in a horizontal direction, grasping the hinging shaft and making the hinging shaft be fixed into the locking seat when an inserted key is rotated to lock.

In this invention, the locking device includes a guiding body which is formed inwardly from the side panel of the base; a main body whose end part is fastened upon the outer surface of the side panel in state that it is fitted in the inside of the guiding body, having a rotating aperture at a certain circumferential surface, a sliding shaft with a screw means projecting from the end thereof and a key hole formed on the outer surface thereof; a rotating body having a locking lug formed on thereof to be put into a locking seat that projects in a predetermined height out of an inner part of the base; and a fixing member having a sliding hole at one part thereto into which a sliding shaft of the main body will be input and having a recess in a predetermined depth and shape at the other part thereto into which the hinging shaft will be input.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
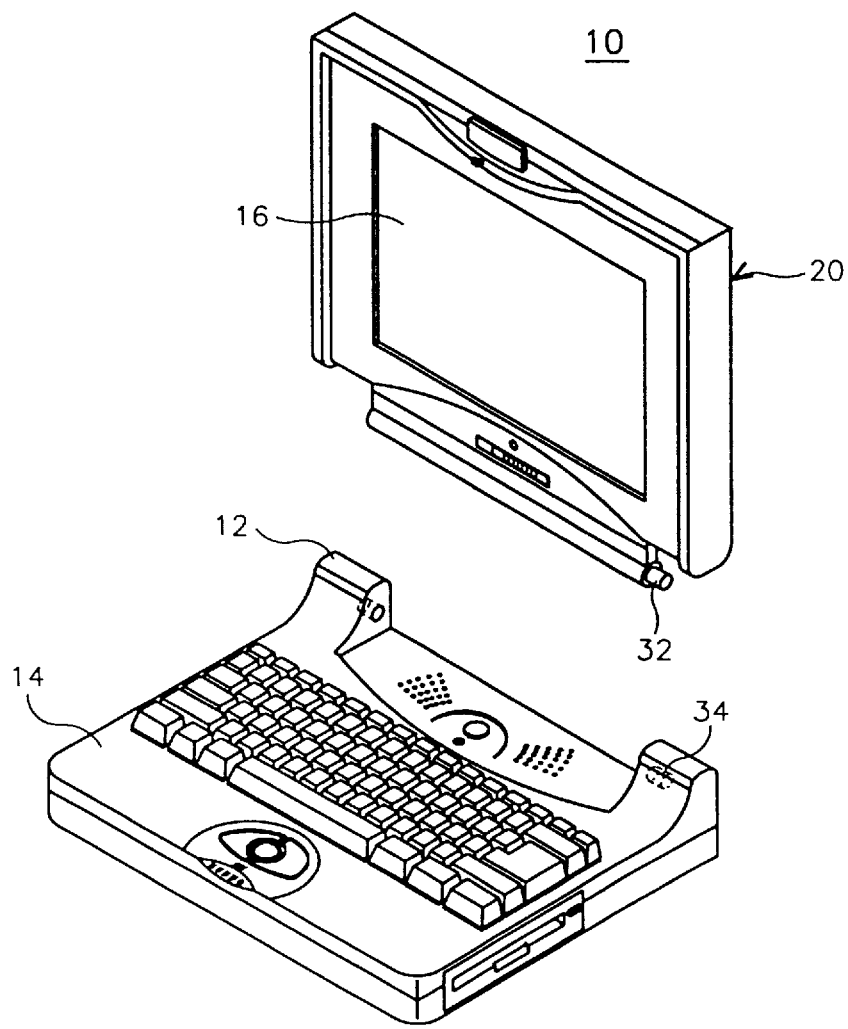
FIG. 1 is a perspective view of a portable computer with its display panel separated from its base.
Figure 2:
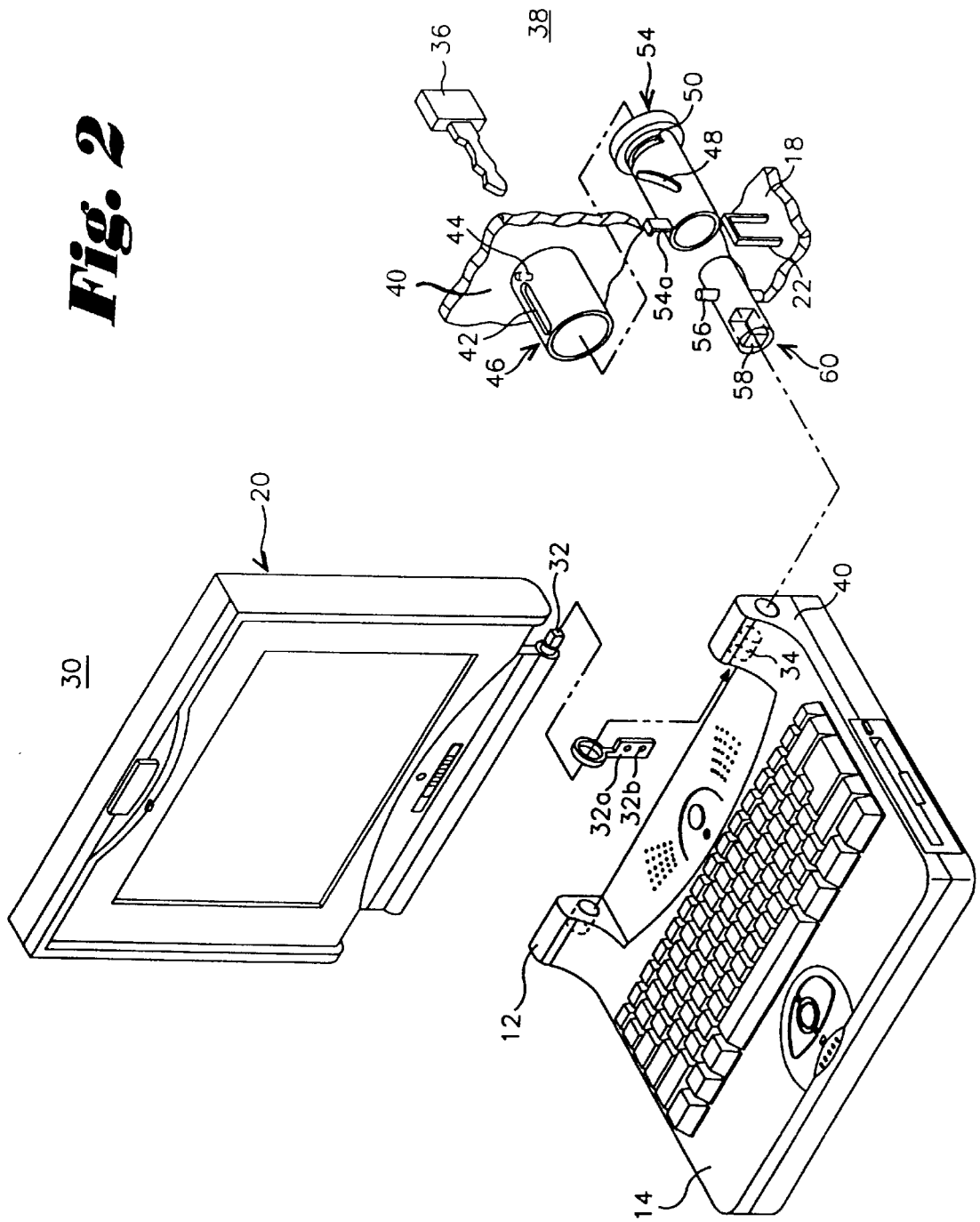
FIG. 2 is an exploded perspective view of a portable computer with a locking device according to one embodiment of the present invention.

FIG. 2 is an exploded perspective view of a portable computer with a locking device 38 according to one preferred embodiment of the present invention. Referring to FIG. 2, a portable computer 30 of the present invention is made up of a base 14 having a hinging part 12 with a hinging hole 34 formed therein, a display panel 20 pivotally mounted on base 14 and having a hinging shaft 32 formed to its lower part, and a locking device 38 installed inside the hinging part, which prevents the hinging shaft 32 from being rotated by moving in a horizontal direction and grasping the hinging shaft 32. The above-mentioned locking device 38 will be now described in greater detail.

Figure 3:
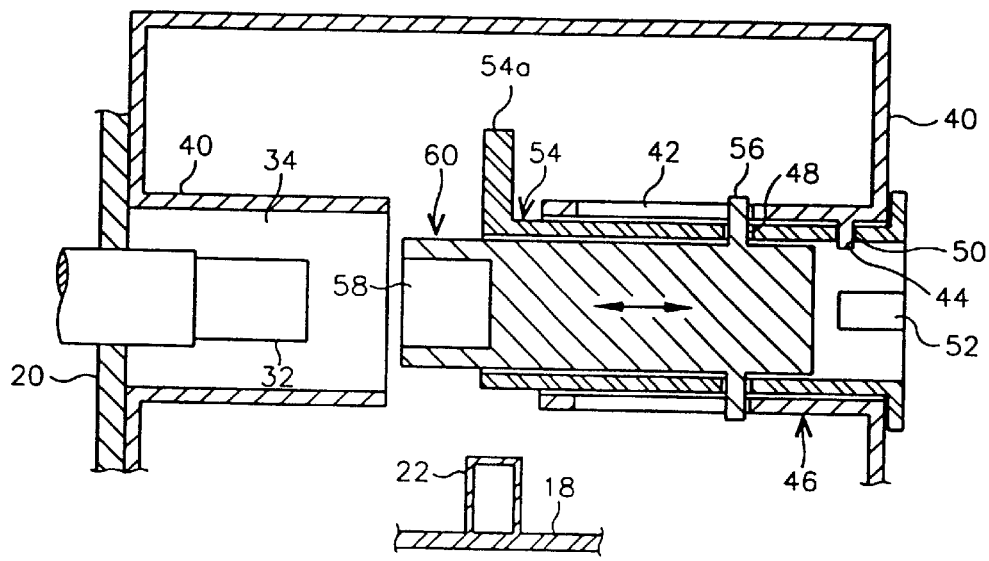
FIG. 3 is a cross-sectional view of hinging part with a locking device installed in it according to an embodiment of the present invention.

The locking device 38, which is incorporated into the hinging part of the base 14 and is formed therein, is made up of a guiding body having a guiding aperture 42 with a predetermined length formed thereon and having a rotating lug 44 placed on the predetermined position therein, a rotating body 54 whose end part is fastened upon the outer surface of the side panel 40 such that it is fitted in the inside of the guiding body 46, having an inclining aperture 48 at a circumferential surface which intersects, at a predetermined angle, with the guiding aperture 42, a rotating aperture 50 into which a rotating lug 44 fits and a key hole 52, as seen FIG. 3, formed on its outer surface, and a fixing member 60 fitted into the inside of the rotating body 54, which has a guiding lug 56 to be put into the guiding aperture 42 through the inclining aperture 48 and a recess 58 with a predetermined depth and shape therein. Further, the end part of the hinging shaft 32 is polygon-shaped.

In this invention, the distance between the end part of the hinging shaft 32 and the end of the fixing member 60 is made to be shorter than the length of the guiding aperture 42, and which permits the end part of the hinging shaft 32 to be fully fitted into the inside of the recess 58 to the fixing member 60 through the horizontal movement of the fixing member 60.

In addition, it is desirable that the key hole 52 be made not to allow the rotating body 54 to be rotated when other metal means than the corresponding key 36 is inserted. The locking device 38 has a locking seat 22 projecting in a predetermined height out of an inner part 18 of the base 14 and a locking lug 54a, which is formed on a predetermined circumferential surface of the rotating body 54, to be fixed into the locking seat 22 when the inserted key 36 is rotated to lock. Further, the rotating body 54 rotates in the same direction as that of opening of the display panel 20 when locked.

Referring to again FIG. 2, the locking device 38 has a locking plate 32a with a locking hole 32b, which makes the base 14 capable of supporting the display panel 20, connected to the hinging shaft 32.

Figure 4:
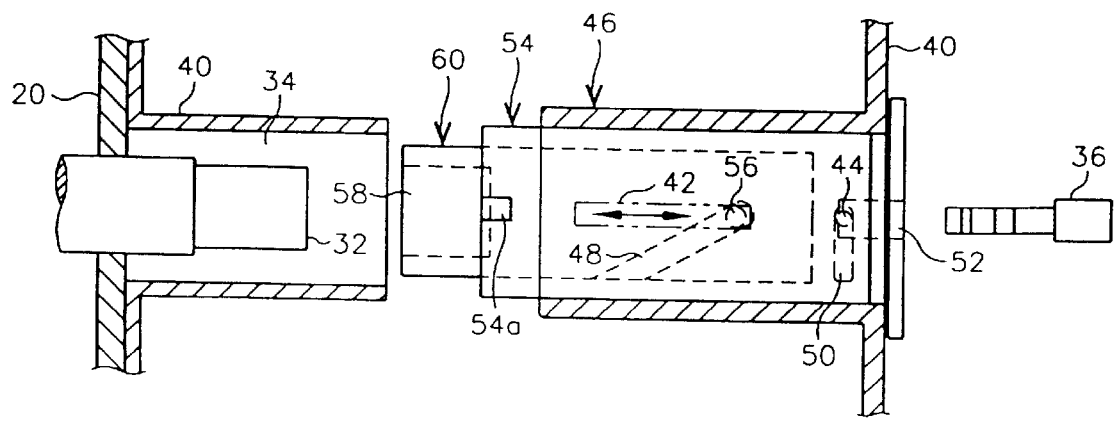
FIG. 4 is a partial cross-sectional view showing a locking device fully installed in an upward direction according to an embodiment of the present invention.

FIG. 3 and 4 are plan views showing front sectional and partial sectional views of the assembling of the locking device in FIG. 2. Referring to FIG. 3, the locking device 38, which is incorporated into the hinging part of the base 14 and is formed therein, comprises a guiding body 46 having a guiding aperture 42 with a predetermined length formed thereon and having a rotating lug 44 placed on the predetermined position therein, a rotating body 54 whose end part is fastened upon the outer surface of the side panel 40 in state that it is fitted in the inside of the guiding body 46, having an inclining aperture 48 at a circumferential surface which intersects, at a predetermined angle, with the guiding aperture 42, a rotating aperture 50 into which a rotating lug 44 fits and a key hole 52 formed on its outer surface; and a fixing member 60 fitted into the inside of the rotating body 54, which has a guiding lug 56 to be put into the guiding aperture 42 through the inclining aperture 48 and a recess 58 with a predetermined depth and shape therein.

The operation of the locking device 38 will be described hereinafter. As shown in FIG. 4, when a user folds down the display panel 20, including the hinging hardware, against the base 14, it folds flush with the upper surface of the keyboard to be securely locked to the base 14, and this is accomplished by accommodating the display panel with a hinging shaft 32 which fits into a hinging hole 34 of the base 14.

After that, when he inserts a proper key 36 into the key hole 52 on the rotating body 54 formed on the side panel 40 and rotates the key 36 in a clockwise direction, the rotating body 54, which will project out of the inside of the guiding body 46, is rotated within the permissible range of a rotating aperture 50 while it is being supported by a rotating lug 44.

While the rotating body 54 is rotating, an inclining aperture 48 on the rotating body 54 is rotating in the same direction and, at the same time, an elongated guiding lug 56, which projects from the outer surface of the fixing member 60, is moved inwardly in a horizontal direction by the guiding aperture 42. As a result, the entire fixing member 60 is moved to the hinging shaft 32 in a horizontal direction. In addition, a locking lug 54a formed on the outer surface of the rotating body 54 is rotated in the same direction to be put into the locking seat 22 formed inside the base 14.

When the fixing member 60 moves in a horizontal direction, the end part of the hinging shaft 32 is fitted into the recess 58 formed inside the fixing member 60, and this prevents the hinging shaft 32 from being rotated. Therefore, it is impossible for any unauthorized person to open the display panel 20, because the end part of the hinging shaft 32, as described above, has been fitted into the fixing member 60 and the locking lug 54a has been put into the locking seat 22.

In this state, when a user will open the display panel 20 to use the portable computer, he can insert his key into the key hole 52 and rotate it in a counter-clockwise direction. Then, the hinging shaft 32 is moved in a reverse to release out of recess 58 and the locking lug 54a slides out of the locking seat 22. This permits the user to unfold the display panel 20 upwardly while the hinging shaft 32 is freely rotated within the hinging hole 34.

Figure 5:
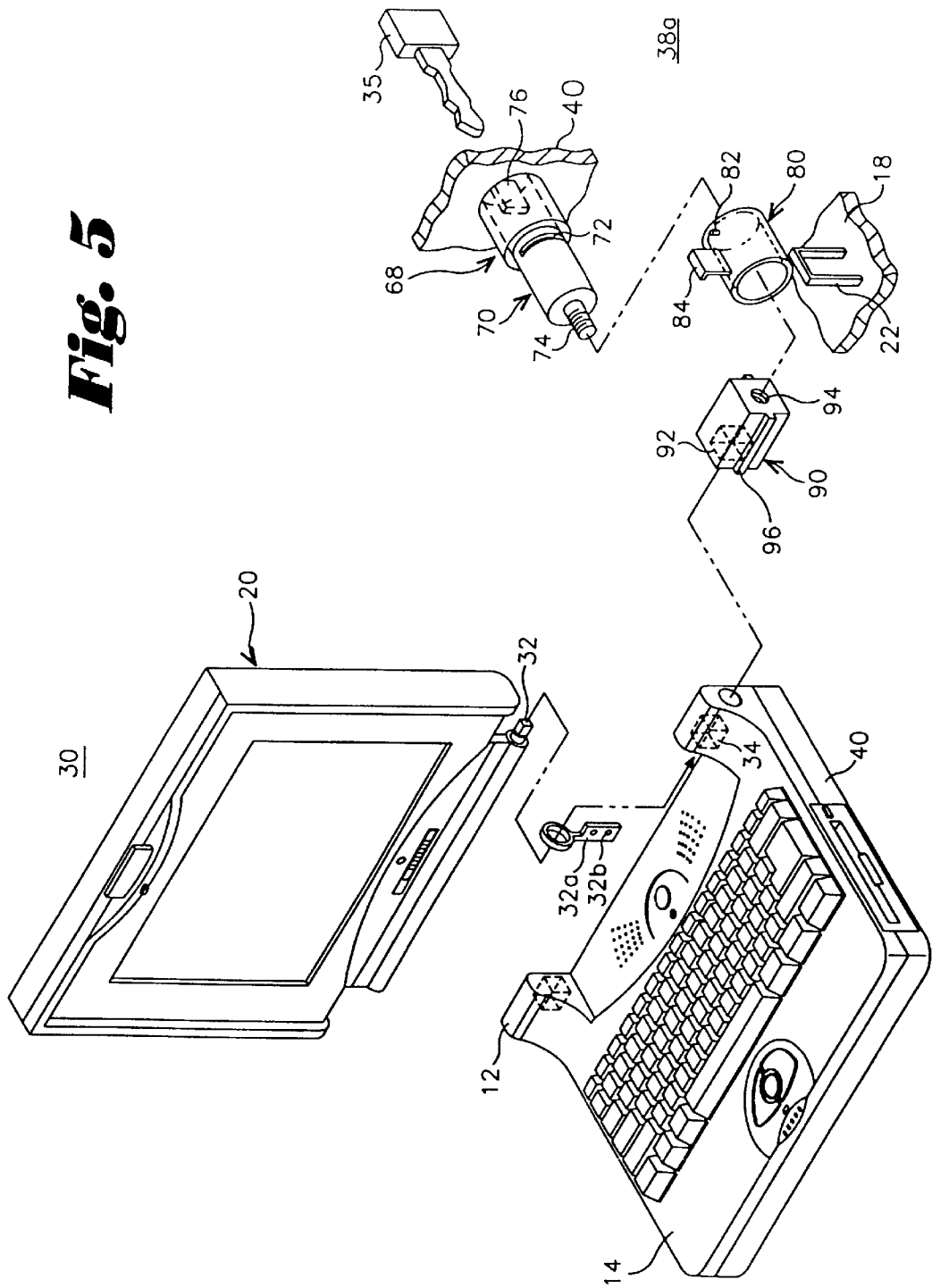
FIG. 5 is an exploded perspective view of a portable computer with a locking device according to another embodiment of the present invention.

FIG. 5 is an exploded perspective view of a locking device according to another embodiment of the present invention. A portable computer 30 in accordance with the present invention is made up of a locking seat 22 projecting in a predetermined height out of an inner part 18 of the base 14, and a locking device 38a installed inside the hinging part 12, which prevents the display panel 20 from being detached out of the base 14 by moving in a horizontal direction, grasping the hinging shaft 32 and making the hinging shaft 32 be fixed into the locking seat 22 when an inserted key 35 is rotated to lock.

In this invention, the locking device 38 includes a guiding body 68 which is formed inwardly from the side panel 40 of the base 14, a main body 70 whose end part is fastened upon the outer surface of the side panel 40 in state that it is fitted in the inside of the guiding body 68, having a rotating aperture 72 at a predetermined circumferential surface, a sliding shaft 74 with a screw means projecting from the end thereof and a key hole 76 formed on the outer surface thereof, a rotating body 80 having a locking lug 84 formed on thereof to be put into a locking seat 22 that projects in a predetermined height out of an inner part 18 of the base 14, and a fixing member 90 having a sliding hole 94 at one part thereto into which a sliding shaft 74 of the main body 70 will be input and having a recess in a predetermined depth and shape at the other part thereto into which the hinging shaft 32 will be input.

The end part of the hinging shaft 32 is polygon-shaped and the distance between the end part of the hinging shaft 32 and the end of the fixing member 90 is made to be shorter than the length of the sliding shaft 74, and which permits the end part of the hinging shaft 32 to be fully fitted into the inside of the recess 92 to the fixing member 90 through the horizontal movement of the fixing member 90. To guarantee the stable motion, the external thread of the main body 70 and the internal thread (not shown) within the sliding hole 94 are to be matched each other.

In addition, the fixing member 90 further is made up of an elongated sliding lug 96 formed on it which is provided to change rotary motion from the main body 70 into horizontal motion In this invention, it is desirable that the key hole 76 be made not to allow the rotating body 80 to be rotated when other metal means than the appropriate key is inserted. Further, the rotating body 80, when locked, rotates in the same direction as that of opening of the display panel 20.

Figure 6:
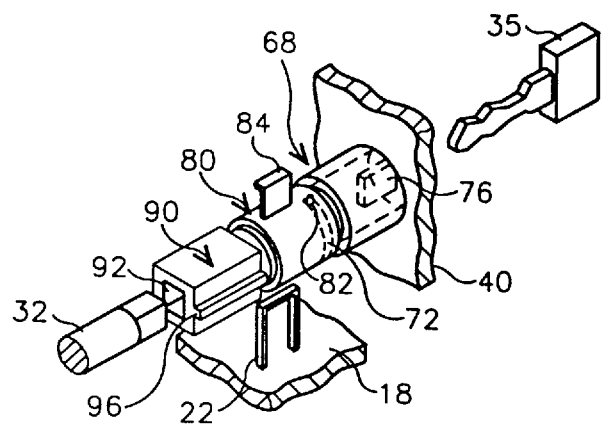
FIG. 6 is a perspective view showing a locking device fully installed according to another embodiment of the present invention.
Figure 7:
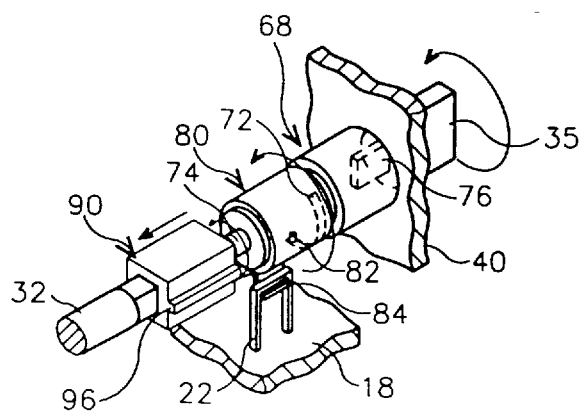
FIG. 7 is a perspective view showing the operation of the locking device according to another embodiment of the present invention.

Referring now to FIG. 6 and 7, in the locking device 38a, the main body 70 is fitted into the inside of the guiding body 68 formed within the side panel 40 of the base 14 while the end part thereof is fastened upon the outer surface of the side panel 40. The rotating body 80 is fitted into the main body 70 while the rotating lug 82 is to be put into the rotating aperture 72 on the main body 70. The sliding shaft 74 of the guiding body 68 is fitted into the sliding hole 94 of the fixing member 90.

The operation of such an invention will be described. Referring to FIGS. 5 through 7, when a user folds down the display panel 20, including the hinging hardware, against the base 14, it folds flush with the upper surface of the keyboard to be securely locked to the base 14, and this is accomplished by accommodating the display panel 20 with a hinging shaft 32 which fits into a hinging hole 34 of the base 14. After that, when the user inserts a proper key into the key hole on the main body 70 and rotates the key in a clockwise direction, the main body 70, which will project out of the inside of the guiding body 68, is rotated within the permissible range of a rotating aperture 72 while a rotating lug 82 is hooked into the rotating aperture 72.

While the rotating body 80 is rotating, a locking lug 84 on the rotating body 80 is rotating in the same direction and is hooked into a locking seat 22. At the same time, while a fixing member 90 is moved in a horizontal direction, the end part of the fixing member 90 is fitted into a recess 92 inside the fixing member 90, and this prevents the hinging shaft 32 from being rotated.

Therefore, it is impossible for any unauthorized person to open the lid, because the end part of the hinging shaft 32, as described above, has been fitted into the fixing member 90 and the locking lug 84 has been put into the locking seat 22.

In this state, when a user will open the display panel 20 to use the portable computer, he can insert his key 35 into the key hole 76 and rotate it in a counter-clockwise direction. Then, the fixing member 90 is moved in a reverse to release out of the hinging shaft 32 and the locking lug 84 slides out of the locking seat 22. This permits him to unfold the display panel 20 upwardly while the hinging shaft 32 is freely rotated within the hinging hole 34.

The advantage of the present invention is that it is impossible for those who try to take any important information out of portable computers by using the locking device of the present invention. In addition to that, it can prevent the loss of all information stored or any malfunction of the system due to access of children to a portable computer.

What is claimed is:

1. A portable computer, comprising:
    a base containing a locking device having a fixing member;
    a display panel pivotally mounted on said base, said display panel having a hinging shaft extending from a side of said display panel along an axis of rotation of said display panel and projecting into said base proximate to said locking device; and
    said fixing member of said locking device being moveable inward along said axis of rotation of said display panel to fit over and to brace said hinging shaft of said display panel to lock said display panel into position and to prevent the rotation of said display panel.

2. The portable computer of claim 1, wherein said locking device comprises:
    a guiding body having an aperture and a lug positioned on an inner surface;
    a rotating body engaged with and positioned in the guiding body, said rotating body comprising:
        a second aperture oriented askew to the guiding aperture; and
        a slot into which said lug fits;
    a key hole formed on an outer surface; and
    said fixing member moveably engaged with an inner surface of the rotating body for locking said display panel in position.

3. The portable computer of claim 2, wherein said rotating body, when locked, rotates in the same direction as that of opening of the display panel.

4. The portable computer of claim 2, wherein said locking device further comprises:
    a locking seat projecting from an inner surface of the base;
    a latch, which is formed on the rotating body, for engaging the locking seat when a key is inserted in said key hole and rotated.

5. The portable computer of claim 1, wherein a distal end of said hinging shaft is polygon-shaped.

6. A portable computer comprising:
    a base containing a locking device;
    a display panel pivotally mounted on said base and having a shaft projecting from an edge along an axis of rotation of said display panel;
    said locking device comprising:
        a fixing part that is laterally moveable along said axis of rotation for engaging said shaft of said display panel; and
        a locking seat attached to an inner surface of said base to limit the rotation of said locking device; and said fixing part being moveable to fit over said shaft of said display panel to lock said display shaft in position and to prevent the rotation of said display shaft.

7. The portable computer of claim 6, wherein said the locking device comprises:

a guiding body having an aperture and a lug on an inner surface;

a rotating body having a locking lug positioned on an inner surface of the base; and said fixing member having a cavity at one end for receivably engaging said hinging shaft.

8. The portable computer of claim 7, wherein said rotating body, when locked, rotates in the same direction as that of the display panel while said display panel is being opened.

9. The portable computer of claim 6, wherein the end part of said hinging shaft is polygon-shaped.

10. A notebook computer, comprising:

a base enclosing a microprocessor and a locking device;

a cover pivotally mounted to said base, having a hinging shaft extending from an edge along an axis of rotation, and bearing a visual display providing varying visual images in response to signals generated by said microprocessor; and said locking device comprising a fixing member moveable inward along said axis of rotation of said cover to fit over and to brace said hinging shaft of said cover to lock said cover into position and to prevent the rotation of said cover.

11. The notebook computer of claim 10, with said locking device both exhibiting a locked state, during which said cover cannot rotate, and an unlocked state, during which said cover can be rotated.

12. The notebook computer of claim 11, further comprising a key insertable into said locking device to either lock or unlock said cover.

13. The notebook computer of claim 12, further comprised of said cover rotating freely about said axis of rotation while said locking device is in said unlocked state.

14. The notebook computer of claim 13, comprised of said visual display being closed flush with said base while said locking device is in said locked state.

* * * * *